May 22, 1951 — C. R. KEITH — 2,554,147
BIASED FILM SOUND RECORDING SYSTEM
Filed Oct. 19, 1948

INVENTOR
C. R. KEITH
BY W. L. Dawson
ATTORNEY

Patented May 22, 1951

2,554,147

UNITED STATES PATENT OFFICE 2,554,147

BIASED FILM SOUND RECORDING SYSTEM

Clyde R. Keith, Maplewood, N. J., assignor to Western Electric Company, Incorporated, New York, N. Y., a corporation of New York Application October 19, 1948, Serial No. 55,341

11 Claims. (Cl. 179—100.3)

This invention relates to the recording of the variations in an electrical current upon a light sensitive medium, and particularly to the recording of the audio frequency variations in an electrical current upon a photographic film.

The object of the invention is a method of, and means for, producing a "direct positive" record, that is, a record which, after developing the fixing, may be directly reproduced without requiring the usual steps of printing a positive copy from the recorded negative. A direct positive record is one which does not require printing; the film which is passed through the recording machine, after development, is suitable for high quality reproduction.

A feature of the invention is the superposition, upon the currents to be recorded, of a constant amplitude current having a frequency sufficiently high that no reproducible record of this current is produced.

Another feature of the invention is the superposition, upon the currents to be recorded, of a current having a frequency outside the range of frequencies of the currents to be recorded, and an amplitude larger than the largest amplitude of the currents to be recorded.

Another feature of the invention is a recording device adapted to normally record a predetermined range of amplitude of the currents to be recorded, but capable of being overloaded, and means for supplying to such a light valve an electrical current having a frequency outside the range of frequencies of the currents to be recorded, and an amplitude large enough to overload the recording device. Preferably, these currents have an amplitude large enough to produce an overload of the recording device of the order of 100 per cent.

Another feature of the invention is a recording system including a biplanar, ribbon light valve, normally spaced to record a predetermined range of amplitudes of the currents to be recorded, and means for supplying to the light valve an electrical current having a frequency outside the range of frequencies of the currents to be recorded, and an amplitude large enough to overload the light valve.

The present invention is embodied in a system for recording sound on a photographic film, using a biplanar ribbon light valve to produce a variable density record by varying the time of exposure of the film. The invention is not thereby limited to the specific recording system disclosed, but is applicable to many other systems, such as the variable intensity system, and to many other types of light valves.

In one widely used system of recording, the recording exposure of a negative film is restricted to the "straight line" portion of the film characteristic; a positive print of the negative film is made with the printing exposure restricted to the "straight line" portion of the positive film characteristic; and the negative and positive films are developed to make the overall gamma substantially unity. The fidelity of the reproduction from such a positive film is satisfactory; but, as these records give minimum distortion for a projected print transmission of about 18 per cent, the volume range is limited. In another system of recording, in which the recording exposure extends over the "toe" of the film characteristic, the projected film transmission may be approximately 50 per cent, but the volume range of the record is usually limited to less than 100 per cent modulation by distortion due to the photographic processes.

In accordance with the present invention, the projected film transmission may be approximately 50 per cent, giving some 8 decibels more output than records made by the "straight line" method, and the distortion is reduced, so that the record may be modulated 100 per cent.

The invention may be understood from the following description, and the associated drawings in which.

Figure 1:
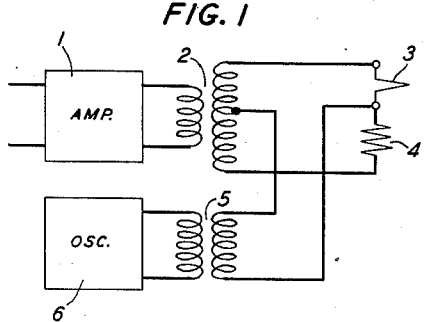
Fig. 1 shows one type of apparatus for embodying the invention in a conventional recording system.
Figure 3:
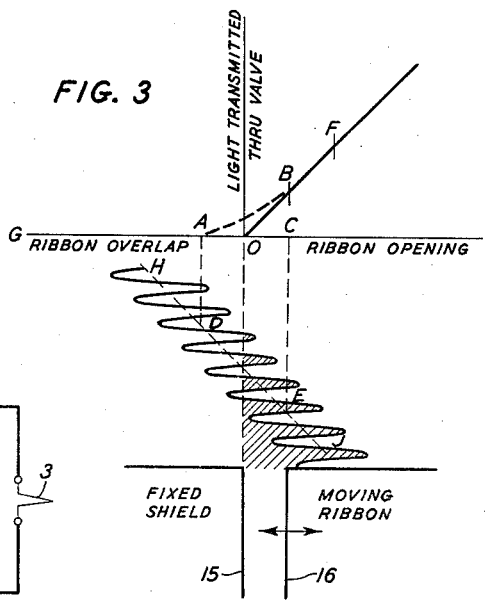
Figure 4:
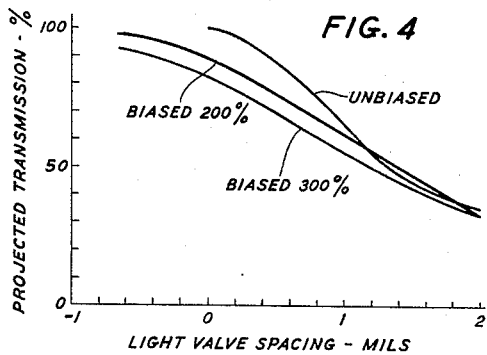
Figure 5:
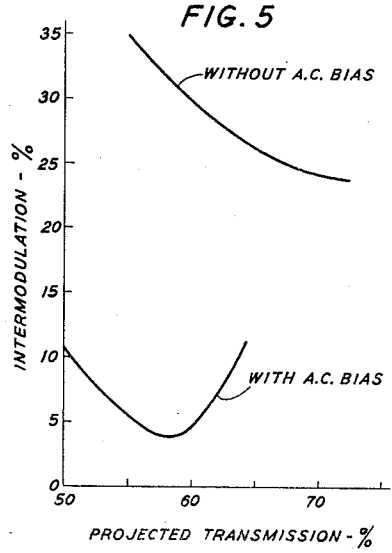
Figure 6:
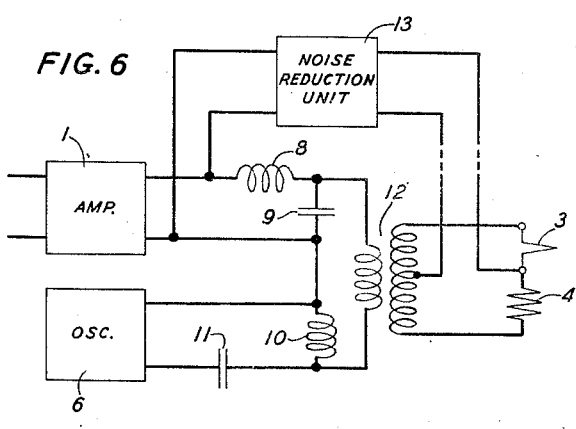

Fig. 3 diagrammatically shows the operation of a system embodying the invention;

Fig. 4 diagrammatically shows the increase in range afforded by the use of the invention; and Fig. 5 diagrammatically shows the reduction in distortion attained by the use of the invention;

Fig. 6 shows a modification of the system shown in Fig. 1.

The invention may be embodied in many recording systems, for example, a recording system of the type described in an article "A simplified all-purpose film recording machine" by G. R. Crane and H. A. Manley, Journal Society Motion Picture Engineers, vol. 46, No. 6, June 1946, page 465 et seq.

In Fig. 1, the amplifier 1 is the output amplifier of any conventional recording system. The primary winding of transformer 2 is connected to the output circuit of amplifier 1. The secondary winding of transformer 2 is connected to the serial combination of the ribbons 3 of a biplanar ribbon light valve and the resistor 4. The transformer 5 has a primary winding connected to the output circuit of an oscillator 6, and a secondary winding connected to a mid-tap in the secondary winding of transformer 2 and to the junction of the ribbons 3 and resistor 4. Resistor 4 has a resistance substantially equal to the resistance of the ribbons 3.

Figure 2:
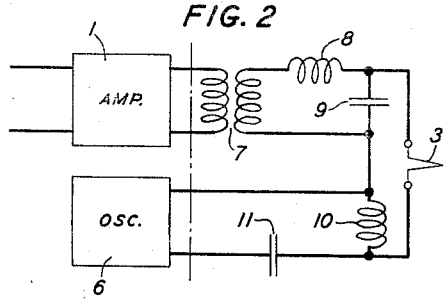
Fig. 2 shows another type of apparatus for embodying the invention in a conventional recording system.

In Fig. 2, the output circuit of amplifier 1, corresponding to the amplifier 1 in Fig. 1, is connected to the combination of the series inductor 8 and shunt capacitor 9. The output circuit of the oscillator 6, corresponding to the oscillator 6 in Fig. 1, is connected to the combination of the shunt inductor 10 and series capacitor 11. The light valve ribbon 3, corresponding to the light valve ribbons 3 in Fig. 1, are connected across the serial combination of the capacitor 9 and the inductor 10.

The oscillator 6, Figs. 1 and 2, produces a current having a frequency outside the range of frequencies of the currents to be recorded. The frequency of the current from the oscillator 6 may be higher than the highest frequency of the currents to be recorded, and may conveniently be of such a value that substantially no record of this frequency is produced.

The two sections of the secondary winding of transformer 2, Fig. 1, with the ribbon, or ribbons, 3 of the light valve, and resistor 4 form a balanced bridge having conjugate points to which the secondary winding of transformer 5 is connected, thus, the current induced in the secondary winding of transformer 2 does not flow in the secondary winding of transformer 5. The current induced in the secondary winding of transformer 5 divides into equal parts flowing in opposite directions in the two sections of the secondary winding of transformer 2, and does not materially affect the operation of this transformer.

The inductor 8 and capacitor 9, Fig. 2, are selected to form a low pass filter passing all currents having frequencies in the range to be recorded, but discriminating against currents from the oscillator 6. The inductor 10 and capacitor 11 are selected to form a high pass filter passing the currents from the oscillator 6 but discriminating against the currents from the amplifier 1.

Other means for preventing interactions between the currents from the amplifier 1 and oscillator 6, such as a tuned circuit or band-pass filter may be used in place of the inductor 10 and capacitor 11 shown in Fig. 2.

For convenience of description, the operation of the system using a single ribbon light valve, for example, a valve of the type shown in U. S. Patent 1,867,729, July 19, 1932, O. O. Ceccarini, will be given in detail, though the same results may be obtained with light valves having a plurality of ribbons disposed in different planes.

In Fig. 3, the height of the light beam impressed on the record is defined by the right edge of the shield 15, and the left edge of the moving ribbon 16. The ribbon 16 is disposed in a plane parallel to the plane of the shield 15, so that the ribbon 16 may pass the shield 15. When at rest, with the initial spacing shown, the light transmitted by the valve will correspond to point B. If a current of the proper polarity be supplied to the ribbon 16, the ribbon 16 will move to the right, and the light transmitted by the valve will increase linearly along the line B—F to the limit of movement of the ribbon. If a current of the opposite polarity be supplied to the ribbon 16, the ribbon 16 will move to the left, linearly decreasing the light transmitted along the line B—O, until the left edge of the ribbon 16 is in alignment with the right edge of the shield 15, closing the light transmitting aperture and reducing the transmitted light to zero. If the applied current continues to increase, the ribbon 16 moves farther behind the shield 15, but the transmitted light is still cut off. When operated in accordance with the prior art, the light transmitted through the valve will vary as shown by the line G—O—F, and a distorted record will be produced. Thus, in prior systems, the oscillation of the ribbon 16 must be limited to a movement which will just cut off the light, that is, from B to O, and a corresponding movement from B to F, and this amplitude of movement is termed 100 per cent modulation.

While the light transmitted through the light valve varies linearly from O to F, Fig. 3, due to photographic distortion, after development, the light projected through the film will not vary linearly with the exposure, but will vary as shown by the curve marked "Unbiased" in Fig. 4 in which the abscissas are the valve spacing in milinches, the normal spacing being 1 mil, and the ordinates are the projected transmission in per cent. Due to the curvature of this characteristic, the reproduced signals are distorted, and the recording range in which the distortion is small enough to be acceptable is considerably less than the full 100 per cent modulation range of the light valve.

When, in accordance with the present invention, a biasing current, having a frequency outside the range of frequencies to be recorded, is superposed upon the light valve in addition to the signal to be recorded, the spacing of the light valve ribbons for each instantaneous value of signal current will go through a sinusoidal variation corresponding to the biasing current, and the resultant movement of the ribbon 16, Fig. 3 will be approximately as shown by the wavy line, the variation due to the signal alone being represented by the dotted line H—J. When the signal has values greater than that represented by the point E, the light transmitted by the light valve varies sinusoidally with the variation in the biasing current, but the average amount of light transmitted is not changed by this variation.

However, as the signal diminishes from E to D, the light valve will be closed for part of the cycle of the biasing current, and the light will be transmitted in pulses, as shown by the shaded portions of Fig. 3. Even when the signal current causes the ribbon 16 to overlap the shield 15, which would normally cut off the light, the bias current may cause a small pulse to be transmitted, as shown by the cycle at D. It is only when the overlap of the ribbon 16 is greater than the swing due to the peak amplitude of the biasing current that the light will be wholly cut off. The characteristic of the light transmitted to the film will then tend to follow the dotted curve from A to B, rather than the lines A—O—B.

In Fig. 3, the peak amplitude of the biasing current produces about 100 per cent modulation of the light valve, but it has been found by experiment that the biasing current may be increased until the peak amplitude of the biasing current produces about 200 per cent modulation of the light valve. Beyond 200 per cent modulation, the advantages gained by this method gradually diminish.

The curve marked "Biased 200%" in Fig. 4, shows the results attained with a two ribbon biplanar light valve normally spaced 1 mil, with biasing current 200 per cent modulation in a system embodying the invention. It will be noted this curve is substantially straight for light valve spacing from 0 to 2 mils, that is for 100 per cent modulation, as compared with the decided curvature of the curve marked "Unbiased"; and that the valve gradually overloads in the region below 0 spacing. The curve marked "Biased 300%" shows the results when the biasing current is increased to a peak amplitude producing 300 per cent modulation. This curve is not as straight as the curve marked "Biased 200%."

One well-known test of the linearity of a recording system is to apply a signal current of relatively low frequency and a signal current of relatively high frequency simultaneously to the recording system, develop the record, and measure the intermodulation products in the signals reproduced from the record. In one test, signals of 60 cycles per second and of 2000 cycles per second were supplied to the light valve at such magnitude as to modulate the ribbons a maximum of 80 per cent. The test was made with various values of current in the recording lamp so as to produce records having different values of projected transmission. The upper curve in Fig. 5 shows the results given by a recording system of known type without any biasing current; while the lower curve shows the results given by the same system under the same conditions except that a biasing current having a frequency of 24 kilocycles per second and a peak amplitude of 200 per cent was also superposed on the signal currents. In the system in accordance with the prior art, the intermodulation was 25 per cent to 35 per cent; whereas in the system embodying the present invention, the intermodulation was reduced to 4 to 12 per cent. By setting the recording lamp so that a record with a projected transmission of about 60 per cent is produced, the intermodulation is reduced to about 4 per cent. Positive type film developed to a sensitometer gamma of about 2.3 was used, and it was found the value of gamma is not critical.

Duplicates of the direct positive film produced in accordance with the present invention may be made by reproducing the film and rerecording on a recording system of the type used in the original recording, but such a procedure is rather costly and time consuming. When duplicate positive records are produced by the usual procedure of printing the direct positive film to produce a master negative film, and printing the master negative film to produce duplicate positive films, the noise level of the duplicate positive films will be found to be undesirably high. By modifying the recording system as shown in Fig. 6, the direct positive film is modified so that master negative and duplicate positive films may be obtained by the usual printing processes with a satisfactory noise level, without materially altering the desirable qualities of the direct positive film.

In Fig. 6, the amplifier 1, oscillator 6, and filter elements 8, 9, 10, 11 correspond to the similarly numbered elements in Fig. 2. The combined outputs of the filters are supplied to the primary winding of a transformer 12, having a tapped secondary winding connected to the ribbons 3 and resistor 4, in a manner similar to the connection of transformer 2, Fig. 1. The output circuit of amplifier 1, Fig. 6, is connected to the input circuit of a noise reduction unit, of any suitable type, such as the units shown in U. S. Patents 1,923,757, August 22, 1933, H. C. Silent and 1,936,176, November 21, 1933, R. R. Scoville, or other units having similar properties. The output circuit of the noise reduction unit is connected to the midtap of the secondary winding of transformer 12 and to the junction of the ribbons 3 and resistor 4, so that, as the envelope of the signal currents decreases the unidirectional current from the unit will increase the spacing of the light valve ribbons, increasing the exposure of the record to produce a higher density and smaller transmission for signals of small average amplitude. The increased density of the direct positive film, when printed, will produce a negative film having reduced density for small signals, which, when printed, will produce a duplicate positive record having increased density, and low noise, for small signals. The distortion curves of Fig. 5 are shown for constant full modulation, and indicate that, for this condition, the intermodulation increases when the transmission is reduced. For less than full modulation, however, the optimum transmission for minimum distortion tends to decrease with the decrease in amplitude of the signals, thus, the reduction in transmission at low amplitudes produced by the noise reduction unit does not produce any appreciable increase in the distortion of the reproduction from the direct positive film.

What is claimed is:

1. The combination, with a film sound recording system including a light valve having a plurality of ribbons located in different planes in a constant magnetic field and vibrated by sound modulated currents to define a recording beam of light directed on a photographic film moving at constant speed to produce an exposure of the film in the region of under exposure of the emulsion, of a source of alternating current having a frequency higher than the highest frequency which can be recorded by the light valve on the film and a circuit connecting said source and said ribbons.

2. The combination of claim 1 in which the amplitude of the alternating current is adjusted to cause the ribbons of the light valve to oscillate a distance substantially double the quiescent ribbon spacing.

3. The combination in claim 1 with a high-pass filter in the circuit connecting said source and said ribbons.

4. The combination with a film sound recording system including a light valve having a stretched ribbon vibrated by sound modulated currents in a constant magnetic field to define a recording beam of light directed on a constantly moving photographic film to produce an exposure of the film in the region of under exposure of the emulsion, of a source of alternating current having a frequency higher than the highest frequency which can be recorded by the light valve on the film and a circuit connecting said source to the ribbon.

5. The combination of claim 4 in which the amplitude of the alternating current is adjusted to cause the ribbon of the light valve to oscillate a distance substantially double the quiescent beam height.

6. The combination of claim 4 with a high-pass filter in the circuit from the source to the ribbon.

7. The combination, with a film sound recording system including a light valve having a stretched ribbon in a constant magnetic field defining the height of a recording beam of light directed on a constantly moving photographic film to produce an exposure of the film in the region of under exposure of the emulsion of the film, of a recording amplifier connected to said ribbon to supply currents vibrating the ribbon in accordance with the frequency pattern of sound, a noise reduction unit connected from said amplifier to said ribbon to supply a current displacing the ribbon in accordance with the volume variations of sound, and an oscillator connected to said ribbon to supply a current vibrating the ribbon at a frequency higher than the highest frequency which can be recorded by the light valve.

8. The combination of claim 7 with a resistor connected in serial relation with the ribbon, a transformer having a primary winding and a tapped secondary winding connected to said resistor and ribbon, a low-pass filter connected to said amplifier, a high-pass filter connected to said oscillator, both said filters being connected to said primary winding and connections from said noise reduction unit to the junction of the resistor and ribbon and to the tap in the secondary winding.

9. The combination, with a film sound recording system including a light valve having a plurality of stretched ribbons disposed in different planes in a constant magnetic field defining the height of a recording beam directed on a constantly moving photographic film to produce an exposure of the emulsion of said film such that, when developed, the film will have a transmission of about sixty per cent, of a recording amplifier connected to said ribbons to supply a current vibrating said ribbons in accordance with sound, and an oscillator connected to said ribbons to supply an alternating current having a frequency higher than the highest frequency which can be recorded by the light valve.

10. The combination of claim 8 with a low-pass filter connected between said amplifier and the ribbons, and a high-pass filter connected between said oscillator and the ribbons.

11. The combination of claim 8 with a resistor connected in serial relationship with the light valve ribbons, a transformer having a primary winding connected to said amplifier and a tapped secondary winding connected to said resistor and ribbons, and connections from said oscillator to the junction of said resistor and ribbons and to the tap in said secondary winding.

CLYDE R. KEITH.

REFERENCES CITED

The following references are of record in the file of this patent:

UNITED STATES PATENTS

| Number | Name | Date |
|---|---|---|
| 1,604,344 | Grissinger | Oct. 26, 1926 |
| 1,765,517 | Wier | June 24, 1930 |
| 2,077,926 | Gibson | Apr. 20, 1937 |

FOREIGN PATENTS

| Number | Country | Date |
|---|---|---|
| 234,386 | Switzerland | Sept. 30, 1944 |